United States Patent Office 3,064,433
Patented Nov. 20, 1962

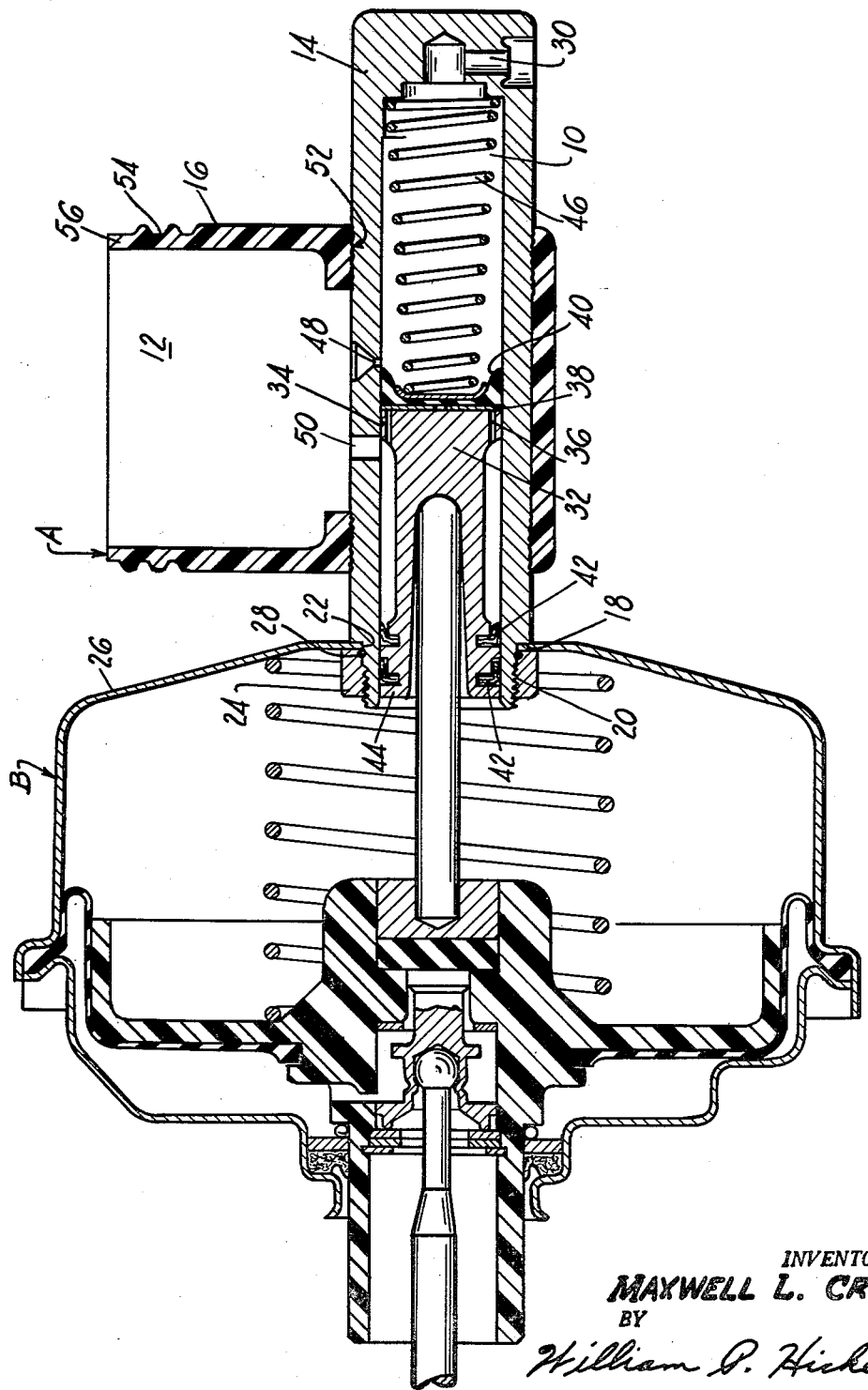

3,064,433
INEXPENSIVE MASTER CYLINDER
Maxwell L. Cripe, South Bend, Ind., assignor to The Bendix Corporation, a corporation of Delaware
Filed Dec. 19, 1960, Ser. No. 76,571
3 Claims. (Cl. 60—54.6)

The present invention relates to master cylinders and the like; and more particularly to a master cylinder for use with, and actuation by, a fluid pressure servomotor.

An object of the present invention is the provision of a simplified design of master cylinder and method of making the same, which is rugged in its construction; efficient in its operation; and inexpensive to manufacture.

A further object of the present invention is the provision of a new and improved master cylinder in which the body of the hydraulic pressurizing chamber is made of bar stock, and the reservoir of the master cylinder is formed by a plastic body which extends around and is sealed to the periphery of the bar.

A still further provision of the present invention is the provision of a new and improved master cylinder, and method of making the same; wherein substantially all of the machining of the pressurizing chamber is done in a bar by a single machine (as for example on an automatic screw machine); and the reservoir portion of the master cylinder is formed by molding the plastic structure around the finished machine bar.

Further objects and advantages of the present invention will become apparent to those skilled in the art to which the invention relates from the following description of the preferred embodiment described with reference to the accompanying drawing forming a part of this specification, and in which:

The solitary FIGURE of the drawing is a cross sectional view of a power operated master cylinder of the type used to actuate automotive hydraulic braking systems, and which embodies principles of the present invention.

The power operated master cylinder shown in the drawing generally comprises a master cylinder A which is affixed to one end of a fluid pressure servomotor B of the general type shown and described in the Maxwell L. Cripe application S.N. 75,596 filed December 13, 1960. Inasmuch as any suitable fluid pressure servomotor B having a relatively stiff housing can be used in conjunction with the master cylinder A it is not believed necessary that a detailed explanation of the construction of the fluid pressure servomotor B be here given. For a complete understanding of its construction and operation, reference may be had to the above mentioned patent application.

The conventional master cylinders used in hydraulic braking systems being manufactured today employ a single cast iron housing which is shaped to provide a fluid pressurizing chamber 10, and a reservoir of low pressure makeup fluid 12. In the manufacture of cast iron master cylinders, it is necessary to perform a number of different machining operations which generally require the master cylinder body to be transferred between a number of different machines in order to complete all of the necessary machining operations.

In the master cylinder A shown in the drawing, the portion which forms the sidewalls of the fluid pressurizing chamber 10 is made from a piece of bar stock; and the portion which houses or provides the reservoir 12 is formed from a piece of plastic which extends around and is sealed to the outer periphery of the bar stock. With the arrangement shown in the drawing, substantially all of the machining operations which are necessary can be performed on the bar stock prior to the time that the plastic body 16 is put in place. The nature of the machined surfaces shown in the drawing is such that the machining operations of the bar can be done in a single machine as for example in an automatic screw machine.

The master cylinder shown in the drawing is drilled and counterbored from one end to provide a fluid pressurizing chamber 10 of approximately the right diameter, after which it is finished machined as by grinding, honing or bearingizing. The periphery of the bar 14 adjacent the outer end of the chamber 10 is turned down to form a shoulder 18 and threads 20 to provide a convenient means for attachment to the end wall of the fluid pressure servomotor B. The end of the servomotor B has an opening therein of substantially the same diameter as the turned portion of the bar stock 14; and the end of the bar 14 is slipped into the opening 22 so that its shoulder 18 engages the end wall of the fluid pressure servomotor B. The master cylinder A is retained on the end wall of the fluid pressure servomotor B by means of a threaded nut 24 which is tightened down upon the inside of the end wall 26 of the servomotor to clamp the end wall between the nut 24 and shoulder 18. In those instances where a suitable seal is desired between the servomotor and master cylinder, a gasket may be used between the shoulder 18 and end wall 26; or as shown in the drawing, the end of the nut 24 may be chamfered and an O-ring 28 clamped between the chamfer and the end wall 26 of the servomotor. The bar 14 may be drilled and tapped axially to provide an outlet attachment for the driven hydraulic braking system; or as shown in the drawing may be drilled and tapped radially as at 30 to receive the usual tubing fitting of the distribution line for the hydraulic braking system.

Any suitable hydraulic piston or displacement member can be used for displacing fluid out of the fluid pressurizing chamber 10; as for example, the spool shaped piston 32 shown in the drawing. The inner flange 34 of the piston 32 is provided with a plurality of axially extending openings 36 therethrough; and the inner end of the openings 32 are covered by an anti-extrusion plate 38 to prevent the cup seal 40 from being extruded into the openings 36. Two annular lip seals 42 are mounted in the rear, or outer, flange 34 of the piston 32 to effect a seal with respect to the sidewalls of the chamber 10; and the piston 32 is biased into its normal retracted position, shown in the drawing adjacent the open end of the chamber 10, by means of the piston return spring 46.

Communication between the reservoir 12 and the chamber 10 is provided by a compensating port 48 positioned just forwardly of the retracted position of the seal 40 shown in the drawing; and a second passageway 50 is provided between the chamber 10 and reservoir 12 just rearwardly of the normal retracted position of the flange 34. It will be seen that the outlet connection 30, compensating port 48, and second passageway 50 have all been positioned radially so that they can be formed by the same machine.

The bar 14 may be of any suitable material and is preferably either of round or hexagonal shaped cold rolled steel bar stock. The plastic body 16 may be molded separately from, or apart from, the bar 14 with a suitable opening 52 therethrough to receive the outer periphery of the bar 14. Where the plastic body 16 is molded separately from the bar 14, a pair of O-rings, not shown, may be used to effect the seal between the plastic body 16 and bar 14 on opposite sides of the compensating ports 48 and 50—as by machining radial circumferentially extending grooves in the periphery of the bar 14.

In the preferred embodiment, shown in the drawing however, the plastic body 16 is molded directly about the bar 14. The plastic body 16 is molded with a reservoir 12 therein which extends down to and includes the top surface of the bar 14 so as to expose the previously machined passageways 48 and 50. In some instances, the periphery of the bar 14 may be knurled to form a rough surface, or depressions, in the region of bond between the plastic body 16 and bar 14; so as to provide additional retentive power between the plastic body and bar. The upper end of the plastic body 16 is generally tubularly shaped and has a suitable circumferentially extending groove molded either in the inner, or other surface, of the tubular portion to retain a cap or cover plate for the reservoir chamber 12. In the embodiment shown in the drawing, a spiral shaped circumferentially extending groove 54 has been provided in the outer periphery of the body 16 to receive the threads of a sheet metal cap which is screwed down upon the end surface 56 of the body 16.

It will be apparent that the objects heretofore enumerated as well as others have been accomplished, and that there has been provided a very inexpensive master cylinder construction, and method of making the same; whereby substantially all of the necessary machining operations are performed in a piece of bar stock, and the reservoir portion of the master cylinder is formed by means of a plastic part which extends about the bar and is preferably molded thereto.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. A master cylinder and the like comprising: a bar having a drilled and finished machined axially extending fluid pressurizing chamber opening externally of one end thereof, the periphery of said bar adjacent said one end being turned to provide a shoulder, threads, and a lock nut on said turned portion to clamp said bar to a support, said bar having a compensating port drilled through its side into said chamber; and a body of plastic cast around said finished machined bar, said body of plastic extending upwardly of said port and being cast with a reservoir chamber therein which exposes the surface of said bar around said compensating port and opens outwardly of said body of plastic.

2. A master cylinder and the like comprising: a bar having an axially drilled fluid pressurizing chamber opening externally of one end thereof, the periphery of said bar adjacent said one end being turned to provide a shoulder, threads, and a lock nut on said turned portion to clamp said bar to a support, said bar having a compensating port drilled through its side into said chamber, and having depressions formed in its surface around its periphery on either side of said compensating port, and a body of plastic cast around said drilled bar over said depressions to surround said port, said body of plastic extending upwardly of said port and being cast with a reservoir chamber therein which exposes the surface of said bar around said compensating port, said reservoir chamber opening outwardly of said body of plastic.

3. A master cylinder and the like comprising: a bar having a drilled and finished machined axially extending fluid pressurizing chamber opening externally of one end thereof, said bar having a compensating port drilled through its side into said chamber; a body of plastic cast around said finished machined bar in the area surrounding said compensating port, said body of plastic extending upwardly of said port and being cast with a reservoir chamber therein which exposes the surface of said bar around said compensating port, said reservoir chamber opening outwardly of said body of plastic and the upper end of said plastic body having a circumferentially extending groove molded therein to retain a closure member for said reservoir chamber.

References Cited in the file of this patent

UNITED STATES PATENTS

| | | |
|---|---|---|
| 1,997,100 | Boughton et al. | Apr. 9, 1935 |
| 2,305,638 | Rockwell | Dec. 22, 1942 |
| 2,719,405 | Ringer | Oct. 4, 1955 |
| 2,725,719 | Springmeier | Dec. 6, 1955 |
| 2,755,629 | Baisch | July 24, 1956 |

UNITED STATES PATENT OFFICE
CERTIFICATE OF CORRECTION

Patent No. 3,064,433                                        November 20, 1962

Maxwell L. Cripe

It is hereby certified that error appears in the above numbered patent requiring correction and that the said Letters Patent should read as corrected below.

Column 3, line 13, for "other" read -- outer --.

Signed and sealed this 23rd day of July 1963.

(SEAL)
Attest:

ERNEST W. SWIDER                                      DAVID L. LADD
Attesting Officer                                          Commissioner of Patents